(12) United States Patent
Li

(10) Patent No.: US 8,320,140 B2
(45) Date of Patent: *Nov. 27, 2012

(54) OPTIMIZING OPERATION OF DC-TO-AC POWER CONVERTER

(75) Inventor: Stephen Li, Xiamen (CN)

(73) Assignee: Fairchild Semiconductor Corporation, South Portland, ME (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/952,045

(22) Filed: Nov. 22, 2010

(65) Prior Publication Data

US 2011/0228577 A1    Sep. 22, 2011

Related U.S. Application Data

(63) Continuation of application No. 12/080,274, filed on Apr. 2, 2008, now Pat. No. 7,839,666.

(51) Int. Cl.
*H02H 7/122*    (2006.01)
*H02M 7/42*    (2006.01)

(52) U.S. Cl. ...................... 363/56.05; 363/71

(58) Field of Classification Search ............ 363/55, 363/56.01, 56.02, 56.05, 56.11, 97, 98, 132, 363/71

See application file for complete search history.

(56) References Cited

U.S. PATENT DOCUMENTS

| 3,596,165 | A  | * | 7/1971  | Andrews         | 363/19    |
|-----------|----|---|---------|-----------------|-----------|
| 4,085,300 | A  | * | 4/1978  | MacKenzie et al.| 219/625   |
| 4,308,576 | A  |   | 12/1981 | Clark           |           |
| 6,130,826 | A  | * | 10/2000 | Matsumoto       | 363/21.15 |
| 6,856,523 | B2 | * | 2/2005  | Griffin         | 363/21.1  |
| 7,092,259 | B2 |   | 8/2006  | Jacobs          |           |
| 7,203,080 | B2 |   | 4/2007  | Aso et al.      |           |
| 7,242,595 | B2 |   | 7/2007  | Yasumura        |           |
| 7,254,046 | B2 |   | 8/2007  | Kawasaki et al. |           |

* cited by examiner

*Primary Examiner* — Gary L Laxton
(74) *Attorney, Agent, or Firm* — Sidley Austin LLP

(57) ABSTRACT

In one embodiment, a power converter system includes an input terminal for receiving a DC input voltage. The power converter system delivers AC power to a load at an output terminal. A transformer is coupled between the input terminal and the output terminal. The transformer has a first winding, a second winding, and a third winding. The output terminal is coupled to the second winding. A half-bridge circuit, coupled between the input terminal and the first winding of the transformer, includes a first switch and a second switch coupled at a common node. The first and second switches are operable to be turned on and off for causing current to flow in the transformer during operation of the power converter system. Circuitry is close coupled to the first winding of the transformer. The circuitry is operable to provide a current path for transformer magnetizing current and reflected load current when both the first and second switches of the half-bridge circuit are turned off, thereby preventing energy from being fed back to the half-bridge circuit.

15 Claims, 3 Drawing Sheets

OPTIMIZING OPERATION OF DC-TO-AC POWER CONVERTER

CROSS-REFERENCE TO RELATED APPLICATION

The present application is a continuation of co-pending U.S. patent application Ser. No. 12/080,274, filed Apr. 2, 2008, entitled, "Optimizing Operation of DC-To-AC Power Converter," the entirety of which is incorporated by reference herein.

BACKGROUND OF THE INVENTION

1. Field of Invention

The present invention relates to power conversion, and more particularly, to optimizing operation of a DC-to-AC power converter.

2. Description of Related Art

Power converters are essential for many modern electronic devices. Among other capabilities, power converters can adjust voltage level downward (buck converter) or adjust voltage level upward (boost converter). Power converters may also convert from direct current (DC) power to alternating current (AC) power, or vice versa. Power converters are typically implemented using one or more switching devices, such as transistors, which are turned on and off to deliver power to the output of the converter. Control circuitry is provided to regulate the turning on and off of the switching devices, and thus, these converters are known as "switching regulators" or "switching converters." The power converters may also include one or more capacitors or inductors for alternately storing and outputting energy.

A DC-to-AC converter according to previously developed designs may be implemented with switching devices connected in a half-bridge arrangement. The converter may employ one or more free-wheeling diodes which are coupled in parallel to the switching devices. The free-wheeling diodes provide an alternate path for current to flow if the switching devices are turned off. Such previously designed DC-to-AC converter, however, could be problematic. For example, energy feedback through the free-wheeling diode can cause an uncontrollable dead zone in the operation of the converter. In the uncontrollable dead zone, the output voltage may not change in response to the switching—i.e., the output voltage is out of control.

FIG. 1 is an exemplary waveform diagram 100 for a power converter system, according to previously developed designs. Diagram 100 includes waveform 102 representing the voltage of the drive or control signal applied to the control terminal (e.g., gate) of a high-side switch in the half-bridge arrangement, waveform 104 representing the voltage of the drive or control signal applied to the control terminal (e.g., gate) of a low-side switch in the half-bridge arrangement, waveform 106 representing the voltage at a node between the high-side and low-side switches, and waveform 108 representing the voltage of the output AC signal of the power converter system.

As shown in diagram 100, the uncontrollable dead zone appears in the waveform 106 after the low-side switch is turned off and before the high-side switch is turned on. As further shown in diagram 100, hard switching may occur as the low-side switch turns on. As a result of the uncontrollable dead zone and hard switching, the AC output voltage of waveform 108 does not have a perfect sinusoidal form.

SUMMARY OF THE INVENTION

Briefly, in some embodiments, the present invention provides circuitry and methods for DC-to-AC power converter having a half bridge topology and transformer, and in some cases using pulse width modulation (PWM) control. The circuitry and methods may employ an auxiliary winding, which is close coupled to primary winding of the transformer, and two switches (e.g., MOSFETs) which are connected in series (e.g., as common source type). The two switches can short the auxiliary winding during a dead zone when both switches of the half bridge topology are off, thus offering a current path for transformer magnetizing current and reflected load current. This prevents energy from feeding back to the DC source. As such, the circuitry and methods support or help to maintain control of the voltage at the output of the power converter, resulting in a more ideal sinusoidal AC output waveform.

According to an embodiment of the present invention, a power converter system includes an input terminal for receiving a DC input voltage. The power converter system delivers AC power to a load at an output terminal. A transformer is coupled between the input terminal and the output terminal. The transformer has a first winding, a second winding, and a third winding. The output terminal is coupled to the second winding. A half-bridge circuit, coupled between the input terminal and the first winding of the transformer, includes a first switch and a second switch coupled at a common node. The first and second switches are operable to be turned on and off for causing current to flow in the transformer during operation of the power converter system. A clamping circuit is close coupled to the first winding of the transformer. The clamping circuit operable to clamp the common node of the half-bridge circuit, thereby controlling a voltage at the common node when both the first and second switches are turned off According to another embodiment of the present invention, a power converter system includes an input terminal for receiving a DC input voltage. The power converter system delivers AC power to a load at an output terminal. A transformer is coupled between the input terminal and the output terminal. The transformer has a first winding, a second winding, and a third winding. The output terminal is coupled to the second winding. A half-bridge circuit, coupled between the input terminal and the first winding of the transformer, includes a first switch and a second switch coupled at a common node. The first and second switches are operable to be turned on and off for causing current to flow in the transformer during operation of the power converter system. Circuitry is close coupled to the first winding of the transformer. The circuitry is operable to provide a current path for transformer magnetizing current and reflected load current when both the first and second switches of the half-bridge circuit are turned off, thereby preventing energy from being fed back to the half-bridge circuit.

Important technical advantages of the present invention are readily apparent to one skilled in the art from the following figures, descriptions, and claims.

BRIEF DESCRIPTION OF DRAWINGS

For a more complete understanding of the present invention and for further features and advantages, reference is now made to the following description taken in conjunction with the accompanying drawings.

DETAILED DESCRIPTION

Figure 1:
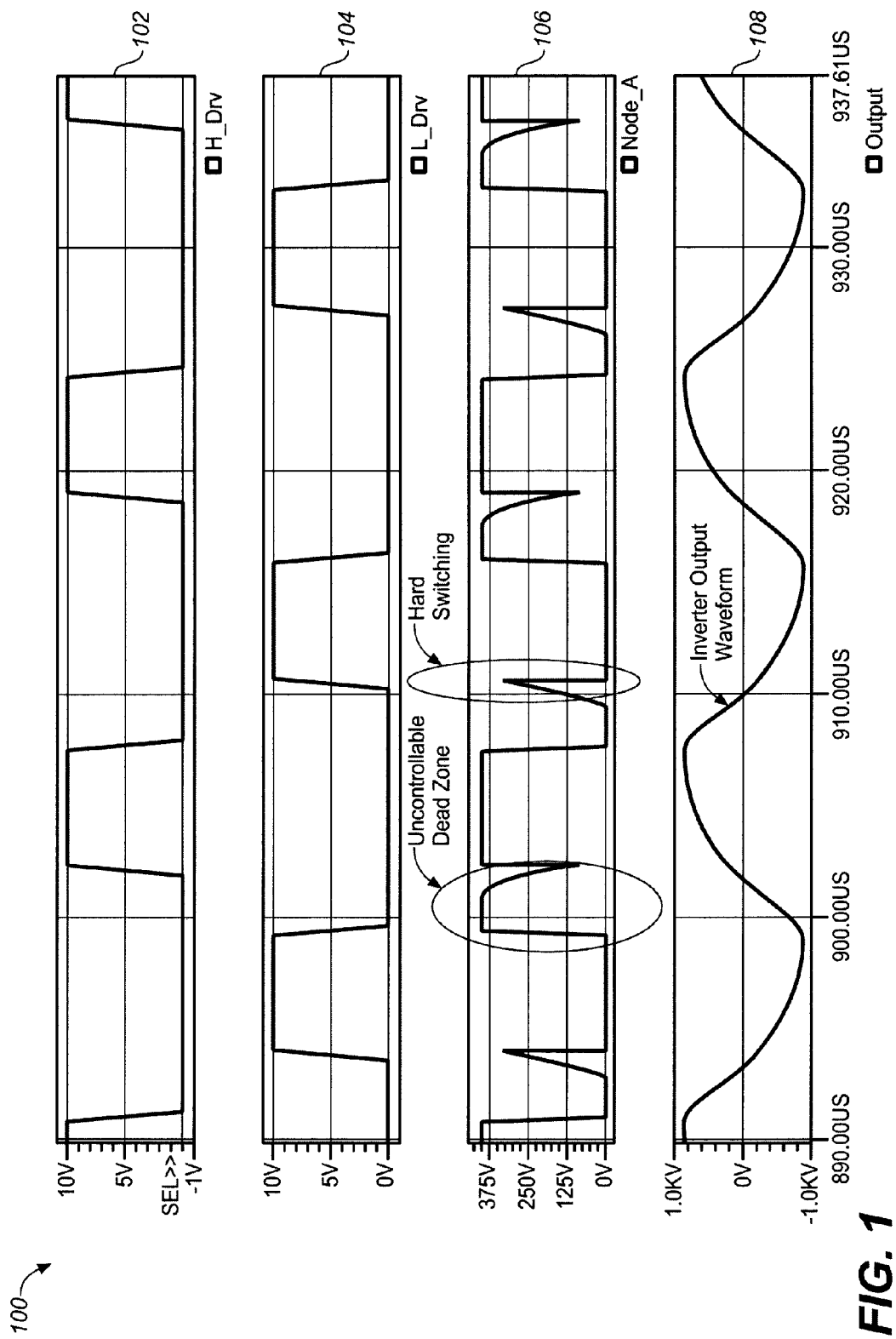
FIG. 1 is an exemplary waveform diagram for a power converter system.
Figure 2:
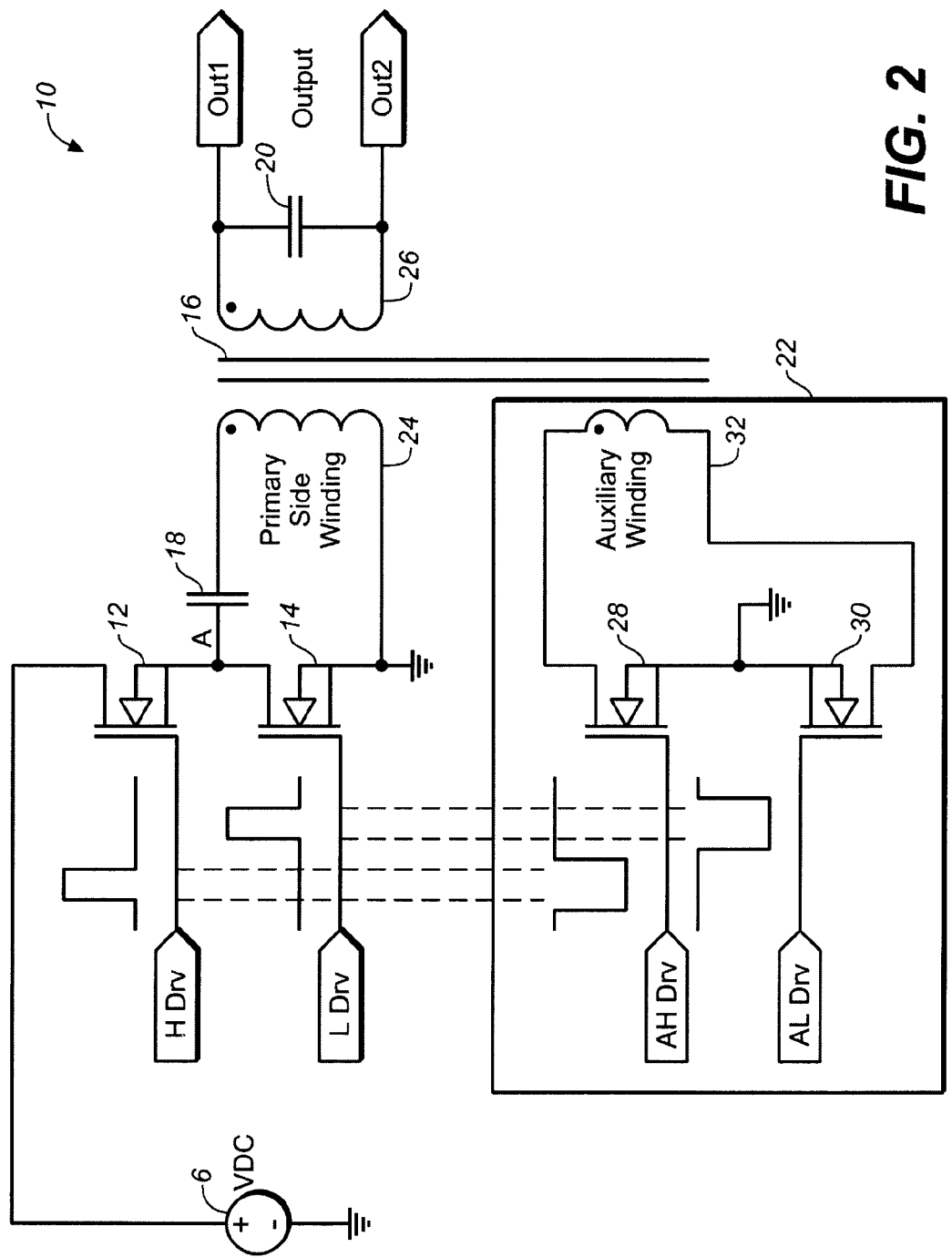
FIG. 2 is a schematic diagram of an implementation of a power converter system, according to an embodiment of the invention.
Figure 3:
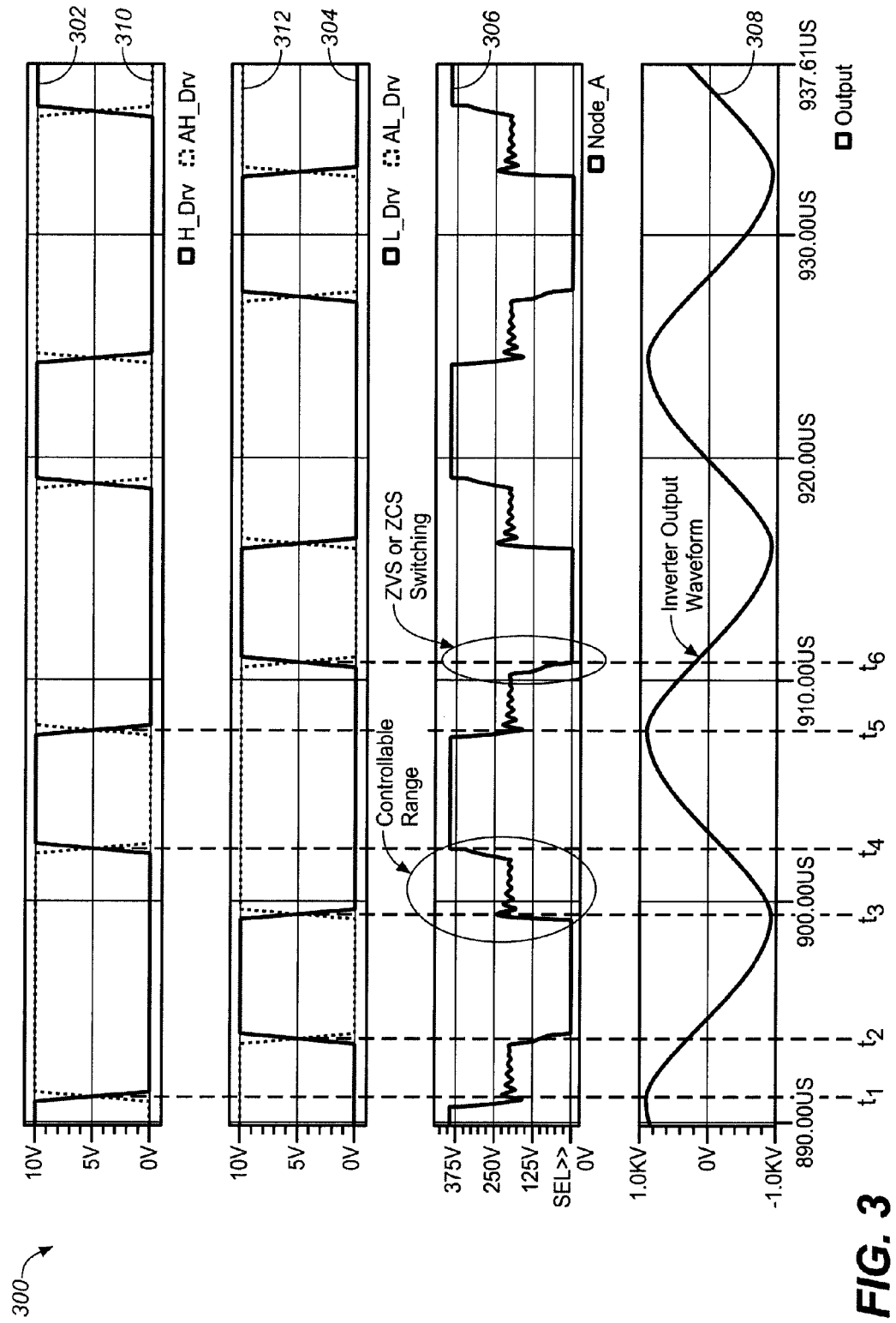
FIG. 3 is an exemplary waveform diagram for the implementation of a power converter system shown in FIG. 2, according to an embodiment of the invention.

Embodiments of the present invention and their advantages are best understood by referring to FIGS. 2 and 3 of the drawings. Like numerals are used for like and corresponding parts of the various drawings.

FIG. 2 is a schematic diagram of an implementation of a power converter system 10, according to an embodiment of the invention. Power converter system 10 can convert a direct current (DC) power to an alternating current (AC) power, and thus, is a DC-to-AC converter. Power converter 10 receives the DC power from a DC power source 6 at an input terminal. The power converter system 10 delivers AC power to a load at output terminals Out1 and Out2.

As shown, power converter system 10 includes switches 12, 14, transformer 16, capacitors 18, 20 and clamping circuit 22.

Switches 12 and 14 are coupled to the input terminal for the DC power source 6. As shown, switches 12 and 14 are connected at a switching node (A) in a half-bridge arrangement or circuit, with switch 12 being the "high-side" switch and switch 14 being the "low-side" switch. As used herein, the terms "connected" or "coupled," or any variant thereof, covers any connection or coupling, either direct or indirect, between two or more elements. The high-side switch 12 may be connected between the DC input voltage source and node A. Switch 12 is turned on to allow current to charge the capacitor 18, and turned off for discharge of the capacitor. The low-side switch 14 may be connected between the node A and ground (GND). The low-side switch 14 is turned off during the charge cycle for capacitor 18, and turned on as the capacitor 18 discharges. Each of the two switches 12, 14 can be implemented with any suitable device, such as, for example, a metal-oxide-semiconductor field effect transistor (MOSFET), an IGBT, a MOS-gated thyristor, or other suitable power device. Each switch 12 and 14 has a control terminal (e.g., gate) to which a respective driving voltage or control signal (H_Drv and L_Drv) may be applied to turn the switch on or off. Control signals H_Drv and L_Drv can provide, for example, pulse width modulated (PWM) control and may be generated by a controller (not shown).

Capacitor 18 is coupled at one end to node A, and coupled at the other end to transformer 16. Capacitor 18 charges through switch 12, and discharges through switch 14. The transformer 16 includes a primary winding 24 and a secondary winding 26. The primary winding 24 is connected to the capacitor 18. In one phase of operation for power converter system 10, current flows through primary winding 24 in one direction—from capacitor 18 and out through ground. In another phase of operation, current flows through primary winding 24 in the opposite direction—from ground and out through capacitor 18. The secondary winding 26 is connected to capacitor 20 and output terminals Out1 and Out2. Current flow through the primary winding 24 causes energy to be stored in the transformer 16 and transferred to secondary winding 26. Current flows in one direction or the other through secondary winding 26, depending on the direction of current flow in the primary winding 24. Current flowing through secondary winding 26 charges and discharges capacitor 20, and causes an AC power to be provided at output terminals Out1 and Out2.

In operation of power converter system 10, dead zones are provided or may occur after one of the switches 12 and 14 of the half-bridge circuit is turned off and before the other of the switches 12, 14 is turned on. During the dead zones, energy may be fed back from capacitor 18 to node A, which causes the voltage at node A to increase. With previous designs for DC-to-AC converter, the increase of voltage at node A between the switches of the half-bridge is not controlled, and as such, the output voltage of the converter may not be responsive to the switching. Thus, the output voltage of the DC-to-AC converter is out of control.

Embodiments of the present invention provide circuitry and methods to minimize or eliminate the uncontrollable dead zone caused by energy feed back in a DC-to-AC converter, thereby widening the effective range for duty control. Embodiments of the present invention improve the AC output waveform of the power converter system 10 and reduce harmonic distortion. Embodiments of the present invention also provide, support, or help the switches of the half-bridge circuit to work at zero voltage switching (ZVS) and zero current switching (ZCS) conditions, thus preventing significant recovery current caused by the body diodes of those switches.

In one embodiment, as shown in FIG. 2, a clamping circuit 22 is provided. Clamping circuit 22 may function to minimize or eliminate the uncontrollable dead zones. Clamping circuit 22 can clamp the voltage at the common node A between switches 12 and 14 of the half-bridge so that it does not rise uncontrollably during the dead zone. Clamping circuit 22 may be implemented with switches 28 and 30 coupled to an auxiliary winding 32 of transformer 10. Auxiliary winding 32 is closed coupled to primary winding 16—i.e., the couple coefficient of the windings is close to unity (1).

Switches 28 and 30 may be connected in series as common source type to the auxiliary winding 32. Switches 28 and 30 short the auxiliary winding 32 when switches 12, 14 of the half-bridge are turned off. Thus, switches 28 and 30 offer a current path for transformer magnetizing current and reflected load current in the dead zone, thereby preventing the energy feed back to source. Each of the switches 28, 30 can be implemented with any suitable device, such as, for example, a metal-oxide-semiconductor field effect transistor (MOSFET), an IGBT, a MOS-gated thyristor, or other suitable power device. Each switch 12 and 14 has a control terminal (e.g., gate) to which a respective driving voltage or control signal (AH_Drv and AL_Drv) may be applied to turn the switch on or off. Control signals AH_Drv and AL_Drv may be generated by a controller (not shown).

Clamping circuit 22 also helps the two half-bridge switches 12, 14 to work under zero voltage switching (ZVS) and zero current switching (ZCS) conditions, thus preventing the huge recovery current caused by body diodes of switches 12 and 14.

In some embodiments, all or a portion of the components of power converter system 10 can be implemented on a single or multiple semiconductor dies (commonly referred to as a "chip") or discrete components. Each die is a monolithic structure formed from, for example, silicon or other suitable material. For implementations using multiple dies or components, the dies and components can be assembled on a printed circuit board (PCB) having various traces for conveying signals therebetween.

The operation of power converter system 10 is described with reference to FIG. 3. FIG. 3 is an exemplary timing diagram 300 for the implementation of a power converter system shown in FIG. 2, according to an embodiment of the invention. Diagram 300 includes waveform 302 representing the control signal H_Drv applied to the high-side switch 12 in the half-bridge arrangement, and waveform 304 representing the control signal L_Drv applied to the low-side switch 14 in the half-bridge arrangement, waveform 306 representing the voltage at a node between the high-side and low-side switches, and waveform 308 representing the voltage of the output AC signal of the power converter system. Superimposed over the waveform 302 for the H_Drv signal is a waveform 310 representing the control signal AH_Drv applied to the switch 28 in the clamping circuit 22. Superimposed over waveform 304 for the L_Drv signal is a waveform 312 representing the control signal AL_Drv applied to the switch 30 in the clamping circuit 22. In one embodiment, a high value for any of control signals H_Drv, L_Drv, AH_Drv, and AL_Drv will cause the respective switch 12, 14, 28, and 30 to turn on, whereas a low value for any of the control signals will cause the respective switch to turn off.

As shown in FIG. 3, the control signal AH_Drv for switch 28 is complementary to the control signal H_Drv for the high-side switch 12. Likewise, the control signal AL_Drv for switch 30 is complementary to the control signal L_Drv for the low-side switch 14.

With reference to FIGS. 2 and 3, in an exemplary operation, when high-side switch 12 is turned on by a high value for H_Drv control signal, current flows from the DC input source 6 to capacitor 18 and through primary winding 24 of the transformer 16. This causes current to flow through secondary winding 26 of the transformer 16, and the voltage at output terminals Out1 and Out2 rises. When high-side switch 12 is turned off, for example at time t1, current ceases to flow from the DC input source 6 to capacitor 18. As such, current flow in the transformer decreases, and the voltage at output terminals Out1 and Out2 decreases. When low-side switch 14 is turned on, for example at time t2, current discharges from capacitor 18 through switch 14. The current flowing through transformer 16 reverses and increases until time t3, when low-side switch 14 is turned off Thereafter, a new cycle begins.

During operation of power converter system 10, dead zones may occur when both the high-side switch 12 and the low-side switch 14 of the half-bridge arrangement are turned off More specifically, there is a dead zone which occurs between the time when the low-side switch 12 turns off and the high-side switch 12 turns on—e.g., for example, between time t3 and time t4. There is also a dead zone which occurs between the time when the high-side switch 12 turns off and the low-side switch 14 turns on—e.g., between time t5 and time t6.

With previous designs of power converters, in such dead zone occurring between the time when the low-side switch turns off and the high-side switch turns on, energy could feed back through a free-wheeling diode, thus resulting in uncontrollable behavior of the power converter. For the dead zone occurring between the time when the high-side switch turns off and the low-side switch turns on, the voltage at the node between the two switches in the half-bridge may rise such that the low-side switch turns on under non-ZVS and non-ZCS conditions, thus making for hard switching.

With embodiments of the present invention, switches 28 and 30 of clamping circuit 22 are both turned on in the dead zones to short the auxiliary winding 32.

Thus, in the dead zone occurring between the time when the low-side switch turns off and the high-side switch turns on the dead zone (e.g., between time t3 and time t4), auxiliary winding 32 and switches 28 and 30 provide a path for transformer magnetizing current and reflected load current. In other words, between times t3 and t4, both of switches 12 and 14 are off, and the primary winding 24 wants to feed back its current to DC power source 6. But auxiliary winding 32 is shorted by auxiliary switches 28 and 30, so the voltage on primary winding 24 will be zero. Primary winding 24 will not feed back current to DC power source 6, and its original current is also transferred to auxiliary winding 32 due to mutual induction. This prevents the energy in transformer 16 from feeding back through the half-bridge. As such, clamping circuit 22 functions to clamp the voltage at node A so that it does not rise uncontrollably during the dead zone. The output voltage of power converter system 10 is thus controllable, and responsive to switching.

And in the dead zone occurring between the time when the high-side switch turns off and the low-side switch turns on (e.g., between time t5 and time t6), clamping circuit 22 is an open circuit. The current through auxiliary winding 32 ceases or is stopped, due to mutual induction. As such, the voltage on primary winding 24 increases, and the voltage at node A will decrease. This helps the switch 14 to work at zero voltage switching (ZVS) and zero current switching (ZCS). Thus, clamping circuit 22 provides for turn-on of the low-side switch 14 under ZVS or ZCS conditions, thereby reducing or eliminating hard switching. ZVS and ZCS conditions on switch 14 eliminates the losses associated with diode reverse recovery current. This greatly reduces switching losses in power converter system 10.

By the operation of clamping circuit 22 described herein, embodiments of the present invention improve the AC output waveform from a DC-to-AC converter and reduce the harmonic distortion. For example, referring to FIG. 3, the output waveform 308 of power converter system 10 has a more ideal sinusoidal form than that of power converters according to previous designs.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A control circuit for use in a power converter system having an input terminal for receiving a DC input voltage; an output terminal at which AC power is delivered to a load; a transformer coupled between the input terminal and the output terminal, the transformer having a first winding, a second winding, and a third winding, wherein the output terminal is coupled to the second winding; a half-bridge circuit coupled between the input terminal and the first winding of the transformer, the half-bridge circuit comprising a first switch and a second switch coupled at a common node, the first and second switches operable to be turned on and off for causing current to flow in the transformer during operation of the power converter system; wherein the control circuit is operable to control a voltage at the common node so that the voltage does not rise uncontrollably in a dead zone of operation when both the first and second switches are turned off.

2. The control circuit of claim 1 wherein the control circuit comprises a clamping circuit coupled to the first winding of the transformer.

3. The control circuit of claim 1 wherein the control circuit is operable to provide a current path for transformer magnetizing current and reflected load current when both the first and second switches of the half-bridge circuit are turned off, thereby preventing energy from being fed back to the half-bridge circuit.

4. The control circuit of claim 1 comprising:
a third winding of the transformer; and
a third switch and a fourth switch coupled to the third winding of the transformer, wherein the third and fourth switches are operable to short the third winding when both the first and second switches of the half-bridge circuit are turned off.

5. The control circuit of claim 4 wherein each of the third and fourth switches comprises a MOSFET, and wherein the third and fourth switches are coupled in series as common source type.

6. The control circuit of claim 1 wherein the control circuit is operable to support zero voltage switching (ZVS) and zero current switching (ZCS) conditions for at least one of the first and second switches of the half-bridge circuit during operation of the power converter system.

7. The control circuit system of claim 1 wherein the control circuit prevents energy from being fed back to the half-bridge circuit of the power converter system during the dead zone.

8. The control circuit of claim 1 wherein at least one of the first and second switches of the half-bridge circuit of the power converter system is controlled by pulse width modulated (PWM) control.

9. A control circuit for use in a power converter system having an input terminal for receiving a DC input voltage; an output terminal at which AC power is delivered to a load; a transformer coupled between the input terminal and the output terminal, the transformer having a first winding, a second winding, and a third winding, wherein the output terminal is coupled to the second winding; a half-bridge circuit coupled between the input terminal and the first winding of the transformer, the half-bridge circuit comprising a first switch and a second switch coupled at a common node, the first and second switches operable to be turned on and off for causing current to flow in the transformer during operation of the power converter system; wherein the control circuit is operable to provide a current path for transformer magnetizing current and reflected load current in a dead zone of operation when both the first and second switches of the half-bridge circuit are turned off, thereby preventing energy from being fed back to the half-bridge circuit.

10. The control circuit of claim 9 wherein the control circuit comprises a clamping circuit coupled to the first winding of the transformer.

11. The control circuit of claim 9 wherein the control circuit comprises:
a third winding of the transformer; and
a third switch and a fourth switch coupled to the third winding of the transformer, wherein the third and fourth switches are operable to short the third winding when both the first and second switches of the half-bridge circuit are turned off.

12. The control circuit of claim 11 wherein each of the third and fourth switches comprises a MOSFET, and wherein the third and fourth switches are coupled in series as common source type.

13. The control circuit of claim 9 wherein the control circuit is operable to support zero voltage switching (ZVS) and zero current switching (ZCS) conditions for at least one of the first and second switches of the half-bridge circuit during operation of the power converter system.

14. The control circuit of claim 9 wherein the control circuit is operable to support maintaining control of a voltage at the output terminal during a dead zone in which both the first and second switches of the half-bridge circuit of the power converter system are turned off.

15. The control circuit of claim 9 wherein at least one of the first and second switches of the half-bridge circuit of the power converter system is controlled by pulse width modulated (PWM) control.

* * * * *